(12) United States Patent
Ambrosi

(10) Patent No.: US 12,714,035 B2
(45) Date of Patent: Aug. 25, 2026

(54) VERTICAL FARM SYSTEM

(71) Applicant: ONO EXPONENTIAL FARMING S.R.L., San Giovanni Lupatoto (IT)

(72) Inventor: Thomas Ambrosi, San Giovanni Lupatoto (IT)

(73) Assignee: ONO EXPONENTIAL FARMING S.R.L., San Giovanni Lupatoto (IT)

( * ) Notice: Subject to any disclaimer, the term of this patent is extended or adjusted under 35 U.S.C. 154(b) by 35 days.

(21) Appl. No.: 18/705,264

(22) PCT Filed: Oct. 27, 2022

(86) PCT No.: PCT/IB2022/060328
§ 371 (c)(1),
(2) Date: Apr. 26, 2024

(87) PCT Pub. No.: WO2023/073602
PCT Pub. Date: May 4, 2023

(65) Prior Publication Data

US 2025/0241248 A1 Jul. 31, 2025

(30) Foreign Application Priority Data

Oct. 29, 2021 (IT) ........................ 102021000027740

(51) Int. Cl.
*A01G 9/18* (2006.01)
*A01G 9/14* (2006.01)
(Continued)

(52) U.S. Cl.
CPC ............... *A01G 9/18* (2013.01); *A01G 9/143* (2013.01); *A01G 9/246* (2013.01); *A01G 9/247* (2013.01); *A01G 9/249* (2019.05); *A01G 31/06* (2013.01)

(58) Field of Classification Search
CPC .......... A01G 9/18; A01G 9/143; A01G 9/246; A01G 9/247; A01G 9/249; A01G 31/06; A01G 7/02
(Continued)

(56) References Cited

U.S. PATENT DOCUMENTS 10,918,031 B2 * 2/2021 Millar .................. A01G 31/042
10,973,185 B2 * 4/2021 Creechley .............. A01G 9/029
(Continued)

FOREIGN PATENT DOCUMENTS

CN 205284409 U 6/2016
CN 207219681 U 4/2018
(Continued)

OTHER PUBLICATIONS

International Search Report for PCT Application No. PCT/IB2022/060328, dated Jan. 25, 2023.

*Primary Examiner* — Maria E Graber
(74) *Attorney, Agent, or Firm* — Seyfarth Shaw LLP

(57) ABSTRACT

A vertical farm system comprises at least two modules each of which has a closed volume thereof with respect to an external environment, wherein a first module comprises a plant crop cultivation apparatus while a second module comprises a collection opening configurable between a closed position and an open position, a movement device configured to convey the plant crops from the cultivation apparatus towards the collection opening through a transfer passage, a carbon dioxide source configured to blow a predetermined amount of carbon dioxide into the first module so as to define at least one respective growth module of the plant crops, and a forced carbon dioxide recovery duct configured to aspirate the carbon dioxide contained in the second module so as to define a collection module of the plant crops.

19 Claims, 9 Drawing Sheets

(51) Int. Cl.
*A01G 9/24* (2006.01)
*A01G 31/06* (2006.01)

(58) Field of Classification Search
USPC .............................................................. 47/17
See application file for complete search history.

(56) References Cited

U.S. PATENT DOCUMENTS

| | | | | |
|---|---|---|---|---|
| 2020/0037524 | A1 | 2/2020 | Friedman | |
| 2020/0163285 | A1 | 5/2020 | Kim | |
| 2020/0359569 | A1* | 11/2020 | Mcnamara ............. | A01G 31/06 |
| 2021/0185955 | A1 | 6/2021 | Sakaguchi et al. | |
| 2021/0204490 | A1* | 7/2021 | Bartrom ................. | A01G 9/042 |
| 2021/0243967 | A1 | 8/2021 | Bartrom et al. | |
| 2022/0087114 | A1* | 3/2022 | Bertram ................... | A01G 9/26 |
| 2023/0225260 | A1* | 7/2023 | Ohshima .................. | A01G 9/26<br>47/66.6 |
| 2023/0312302 | A1* | 10/2023 | Bolard ................... | A01K 1/031 |

FOREIGN PATENT DOCUMENTS

| | | | |
|---|---|---|---|
| CN | 108031238 | A | 5/2018 |
| CN | 109804820 | U | 5/2019 |
| CN | 108064582 | B | 1/2021 |
| KR | 101256335 | B1 | 4/2013 |
| KR | 20210001509 | A | 7/2021 |
| RU | 2720919 | C1 | 5/2020 |
| WO | 2017/199621 | A1 | 11/2017 |
| WO | 2019030606 | A1 | 2/2019 |
| WO | 2019208279 | A1 | 10/2019 |

* cited by examiner 1
2
2
3
4
4
5
6
6
7
8
B
B

5
C
3
8
7
4
B
6
8
7
P
6
1

1
2
2
3
4
5
6
7
8
C
P 12
13
14
13
15
11
10
4

2
7
8

VERTICAL FARM SYSTEM

TECHNICAL FIELD

The present invention relates to a vertical farm system. In particular, the invention relates to a vertical farm system, especially for hydroponic or similar crops, with automatic management and with substantially vertical extension.

PRIOR ART

The processes triggered by humans, for example the massive use of fossil fuels and the intensive breeding of animals for slaughter or for dairy production, generate a considerable quantity of carbon dioxide which, once released into the atmosphere, becomes one of the main causes of global warming, inducing effects on the planet's climate.

Various international government agencies have long been involved in providing guidelines and protocols to drastically reduce carbon dioxide emissions, even up to starting to reduce the carbon dioxide already present in the atmosphere.

To this end, it is now standard practice to introduce pre-established quantities of carbon dioxide in greenhouse crops so as to accelerate and improve the production of the cultivated plants. The ventilation systems are configured to distribute a predetermined quantity of external air enriched with a flow of carbon dioxide from industrial plants. This practice allows to increase the productivity of the plants with a consequent reduction of the useful times for obtaining biomass.

However, since the sowing, positioning and collection activities are managed by specialised personnel, the introduction of carbon dioxide in particularly significant quantities is not allowed at any time. In fact, to ensure the safety of people, the introduction of carbon dioxide must mainly occur at night, when the personnel are not operating inside the greenhouse.

SUMMARY

In this context, the technical task underlying the present invention is to propose a vertical farm system which obviates the drawbacks in the known art as described above.

In particular, an object of the present invention is to provide a vertical farm system which can be safely used by a user.

Another object of the present invention is to provide a vertical farm system configured to automatically manage each growth phase of the plant crops. Therefore, specifically, the invention has the object of providing a vertical farm system, in which the presence of man is not necessarily required during each growth phase of the plant crops.

A further object of the present invention is to provide a vertical farm system configured to recycle at least part of the carbon dioxide present in the environment and/or at least part of the carbon dioxide produced by industries.

The stated technical task and specified objects are substantially achieved by a vertical farm system which comprises the technical features disclosed in the independent claim. The dependent claims correspond to further advantageous aspects of the invention.

The invention relates to a vertical farm system.

In particular, the vertical farm system comprises at least two modules, each of which has a closed volume thereof with respect to an external environment, in which a first module comprises a plant crop cultivation apparatus and is arranged in fluid connection with a carbon dioxide source so as to define a growth module configured for cultivating plant crops, while a second module comprises a collection opening configurable between a closed position and an open position, in which the respective internal volume is accessible from the external environment, and is arranged in fluid connection with a forced recovery duct so as to define a collection module configured to collect the plant crops.

Therefore, the vertical farm system comprises a carbon dioxide source configured to blow a predetermined quantity of carbon dioxide into at least one growth module and a forced carbon dioxide recovery duct configured to aspirate the carbon dioxide contained in at least one collection module.

In addition, the vertical farm system comprises a movement means configured to convey the plant crops from the cultivation apparatus to the collection opening through a transfer passage made between the growth module and the collection module.

Advantageously, the introduction of carbon dioxide inside a growth module is capable of accelerating and improving the production of the plant crops with a consequent reduction of the times necessary for the production of biomass.

Advantageously, the carbon dioxide usable for the plant crops can be recovered directly from the external environment and/or directly from the industries which produce carbon dioxide as waste in their operating processes. Thereby, it is therefore possible to use a product generally considered waste, and even harmful to the planet, as a nutritious product and capable of stimulating the growth of plant crops.

Consequently, the creation of a collection module in which the concentration of carbon dioxide can be reduced, until it is brought to concentrations which are not harmful to humans (preferably trying to completely cancel it), allows a user to collect the plant crops in total safety.

Furthermore, by virtue of the forced carbon dioxide recovery duct and the possibility of using a collection module as a compensation chamber for the collection of the cultivated plant crops, the carbon dioxide can be blown into the growth module continuously throughout the day, without the need for interruptions due to the presence of users (who are not physically inside the system 1, but collect the plant crops through specific collection openings).

The present summary and the following detailed description describe the possibility of blowing and/or aspirating carbon dioxide in each internal volume of a respective module of the vertical farm system. In this regard, it is specified that the carbon dioxide must not be considered the only possible gas present in the aforesaid modules. Normally, in fact, each module of the vertical farm system has ambient air or a specific gaseous mixture (depending on the plant crop contained therein) which can be enriched by blowing a predetermined quantity of carbon dioxide useful for the development and cultivation of said plant crop. Therefore, according to a possible aspect of the invention, following the total aspiration of the carbon dioxide present in a collection module, the standard condition inside the aforesaid module (i.e., the presence of ambient air) can be restored, keeping the collection opening open for a predetermined time interval.

BRIEF DESCRIPTION OF THE DRAWINGS

Further features and advantages of the present invention will become more apparent from the indicative and thus non-limiting description of a preferred but non-exclusive embodiment of a vertical farm system, as illustrated in the attached drawings, in which.

The drawings serve solely to illustrate embodiments of the invention with the aim of better clarifying, in combination with the description, the inventive principles on which the invention is based.

DETAILED DESCRIPTION OF AT LEAST ONE EMBODIMENT

The present invention relates to a vertical farm system which, with reference to the figures, has been generally indicated by the number 1.

Any modifications or variants which, in the light of the description, are evident to the person skilled in the art, must be considered to fall within the scope of protection established by the present invention, according to considerations of technical equivalence.

Figure 1:
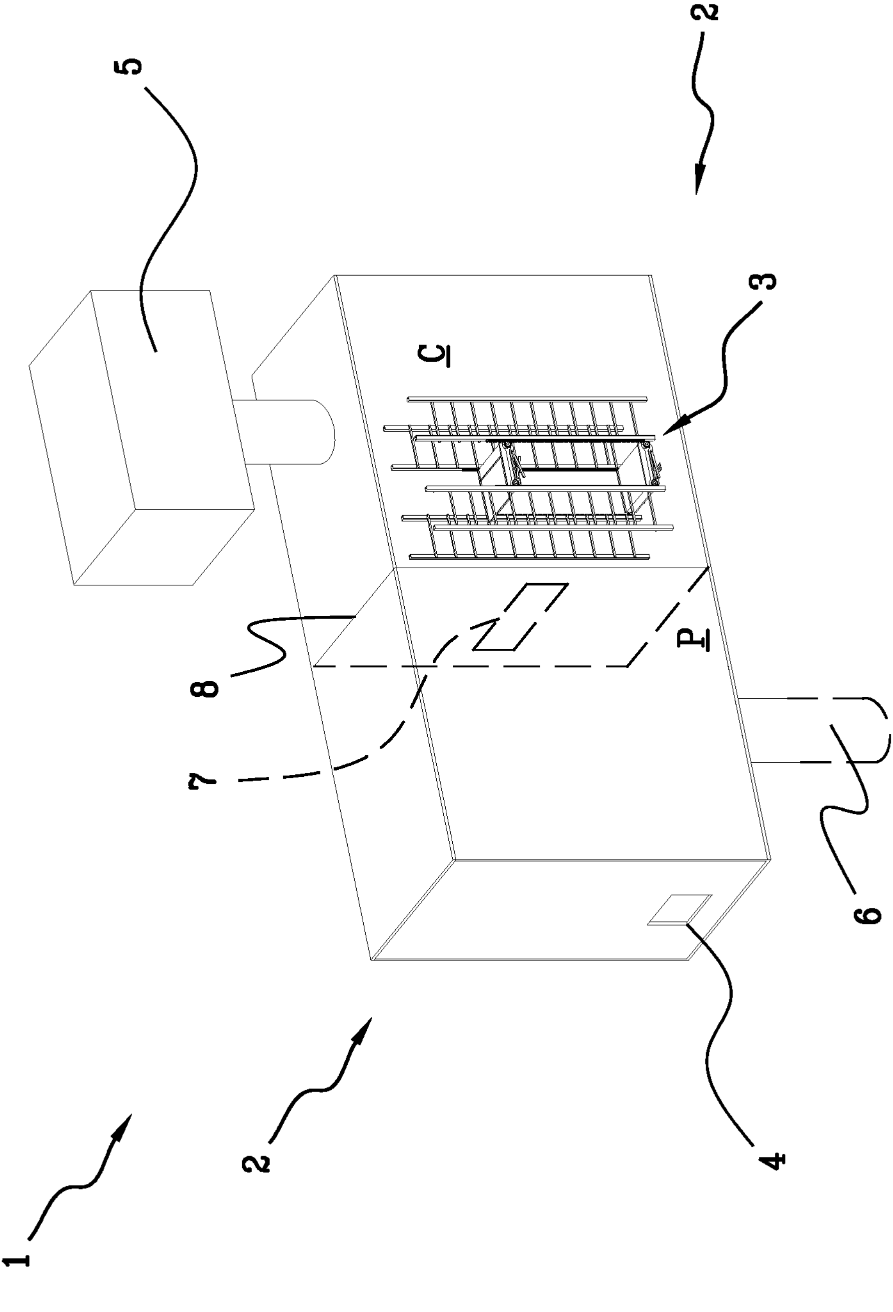
FIG. 1 illustrates a general view of a vertical farm system in accordance with the invention.
Figures 8A, 8B:
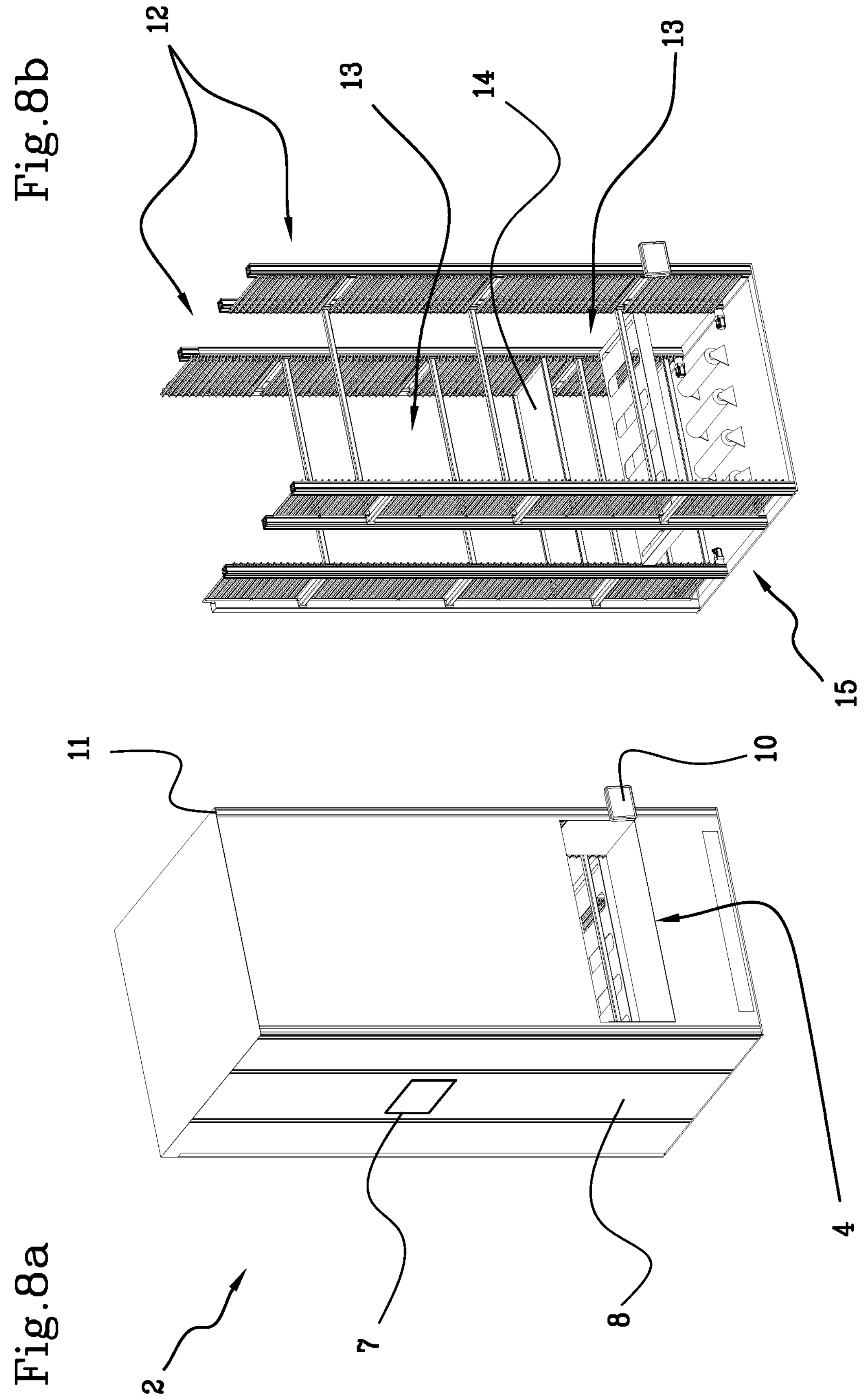
FIGS. 8*a* and 8*b* illustrate, in perspective view, a possible embodiment of a growth and/or collection module, respectively, with and without a box-like body.
Figure 9:
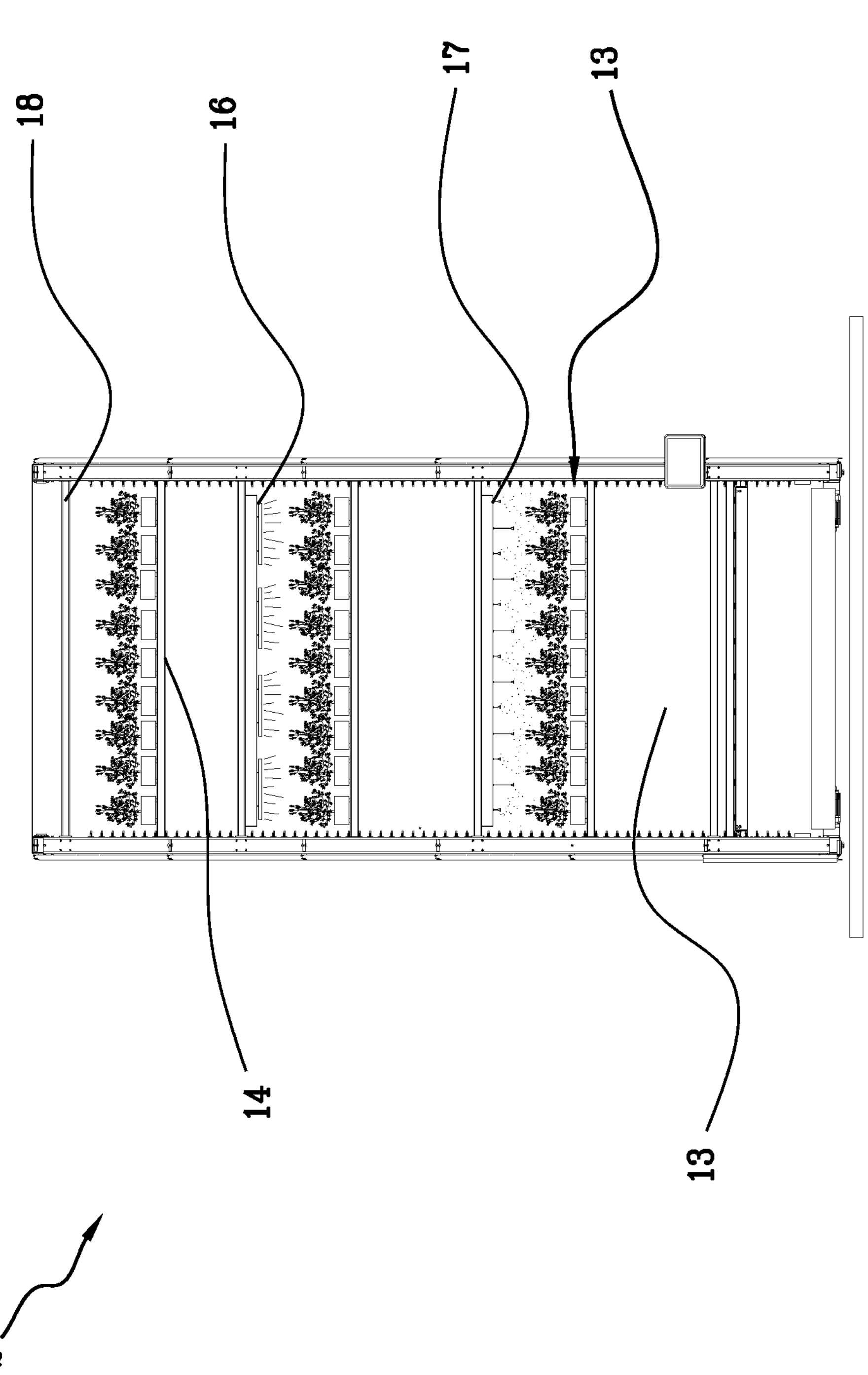
FIG. 9 illustrates, in front view, a shelving positionable inside a vertical farm system in accordance with the invention.

FIG. 1 shows a vertical farm system 1 comprising at least two modules 2 each of which has a closed volume thereof with respect to an external environment, in which a first module comprises a plant crop cultivation apparatus 3, while a second module comprises a collection opening 4 configurable between a closed position and an open position, in which the respective internal volume is accessible from the external environment. In order to make FIGS. 2-6 more comprehensible, the plant crop cultivation apparatus 3 has been depicted only in some modules 2 of the aforesaid figures. In any case, as better explained below, the cultivation apparatus 3 can be installed (and, therefore, can also be depicted) substantially in each of the modules 2 of a vertical farm system 1, i.e., both in the first modules (subsequently called growth modules C), and in the second modules (subsequently called collection modules P), and in the modules configured to operate both as first and second module (subsequently called bi-functional modules B). FIGS. 8*a*, 8*b* and 9 illustrate a possible embodiment of the plant crop cultivation apparatus 3.

The first module is arranged in fluid connection with a carbon dioxide source 5 so as to define a growth module C configured to cultivate plant crops, while the second module is arranged in fluid connection with a forced recovery duct 6 so as to define a collection module P configured to collect plant crops.

In detail, the carbon dioxide source 5 is configured to blow a predetermined quantity of carbon dioxide into at least one growth module C, while the forced carbon dioxide recovery duct 6 is configured to aspirate the carbon dioxide contained in at least one collection module P.

For example, the carbon dioxide source 5 is configured to also blow a quantity of 10,000 ppm of carbon dioxide molecules into the growth module C.

Thereby, the carbon dioxide source 5 is capable of greatly increasing the level of carbon dioxide inside the growth module C so as to increase the growth of the plant crops by up to 50% (with reference to the normal growth and development speed). Preferably, even during the blowing of carbon dioxide, the pressure inside the growth module C remains substantially comparable with atmospheric pressure, or slightly above atmospheric pressure as better explained below.

In addition, the vertical farm system 1 comprises a movement means (not illustrated) configured to convey the plant crops from the cultivation apparatus 3 towards the collection opening 4 through a transfer passage 7 made between the first module and the second module.

Advantageously, the introduction of carbon dioxide inside a growth module C is capable of accelerating and improving the production of the plant crops with a consequent reduction of the times necessary for the production of biomass.

Advantageously, the carbon dioxide usable for the plant crops can be recovered directly from the external environment and/or directly from the industries which produce carbon dioxide as waste in their operating processes. Thereby, it is therefore possible to use a product generally considered waste, and even harmful to the planet, as a nutritious product and capable of stimulating the growth of plant crops.

In accordance with a further aspect of the invention, the forced carbon dioxide recovery duct 6 allows to lower (up to almost cancelling, if possible) the concentration of carbon dioxide at least inside the collection module P, so as to allow a user to safely collect the plant crops.

Preferably, the transfer passage 7 is obtained on a bulkhead 8 interposed between two adjacent modules 2. Even more preferably, the transfer passage 7 is a mechanized opening between different areas which can advantageously be closed so as to hermetically separate the respective internal volumes of the adjacent modules 2. That is, when closed, the passage 7 is sealed so as to prevent the exchange of matter (i.e., vegetable crops, carbon dioxide, or any gas flow) between the aforesaid adjacent modules 2.

According to a preferred aspect of the invention, the collection opening 4 is shaped as a window obtained at a height suitable for being easily used by a user for the collection of the plant crops.

In accordance with an aspect of the invention, the carbon dioxide source 5 is configured to blow a quantity of carbon dioxide such that the resulting pressure in the closed volume of the growth module C is at least equal to the atmospheric pressure value.

Preferably, the carbon dioxide source 5 is configured to blow a quantity of carbon dioxide such that the resulting pressure in the closed volume of said growth module is above the atmospheric pressure value.

Even more preferably, the difference between the pressure value inside each module and the ambient pressure value is at least 0.2 bar.

Thereby, since the pressure inside each module is greater than or at least equal to the ambient pressure value, the system 1 is capable of operating in a condition such as to avoid possible contamination from the environment outside the same system 1. In particular, the overpressure condition is significantly advantageous and reliable if there are cracks or particularly defective/worn gaskets, the overpressure being capable of effectively obstructing the entry of air from the outside.

In accordance with another aspect of the invention, the forced recovery duct 6 is configured to convey the amount of carbon dioxide aspirated from each collection module P to the carbon dioxide source and/or to a carbon dioxide collection tank (not illustrated) and/or to a growth module C so as to define a closed circuit with carbon dioxide recirculation.

Advantageously, the presence of a closed circuit with the possibility of carbon dioxide recirculation avoids waste and ensures that the carbon dioxide is not (re-)introduced into the environment.

Even more advantageously, the carbon dioxide aspirated from the forced recovery duct 6 can be conveyed and stored (under pressure) in a different tank from the carbon dioxide source 5 and also from any module 2 of the vertical farm system 1. The presence of the aforesaid tank is advantageous if it is not possible or convenient to reintroduce the carbon dioxide aspirated from the collection module P into further modules 2, since such a "recycled" concentration could alter the equilibrium condition generated for maximizing the growth of the plant crops (and obtained through the retroactive operation of the sensors for the analysis of the air composition, if present, as better explained below).

Possibly, the carbon dioxide stored in the aforesaid tank could be used as a priority over the activation of the carbon dioxide source 5 and, therefore, the use of the carbon dioxide contained therein.

As better explained below, the conveyance of the carbon dioxide aspirated from the forced recovery duct 5 is managed as a function of the comparison between the detected carbon dioxide concentration and that desired inside each other module.

Figure 2:
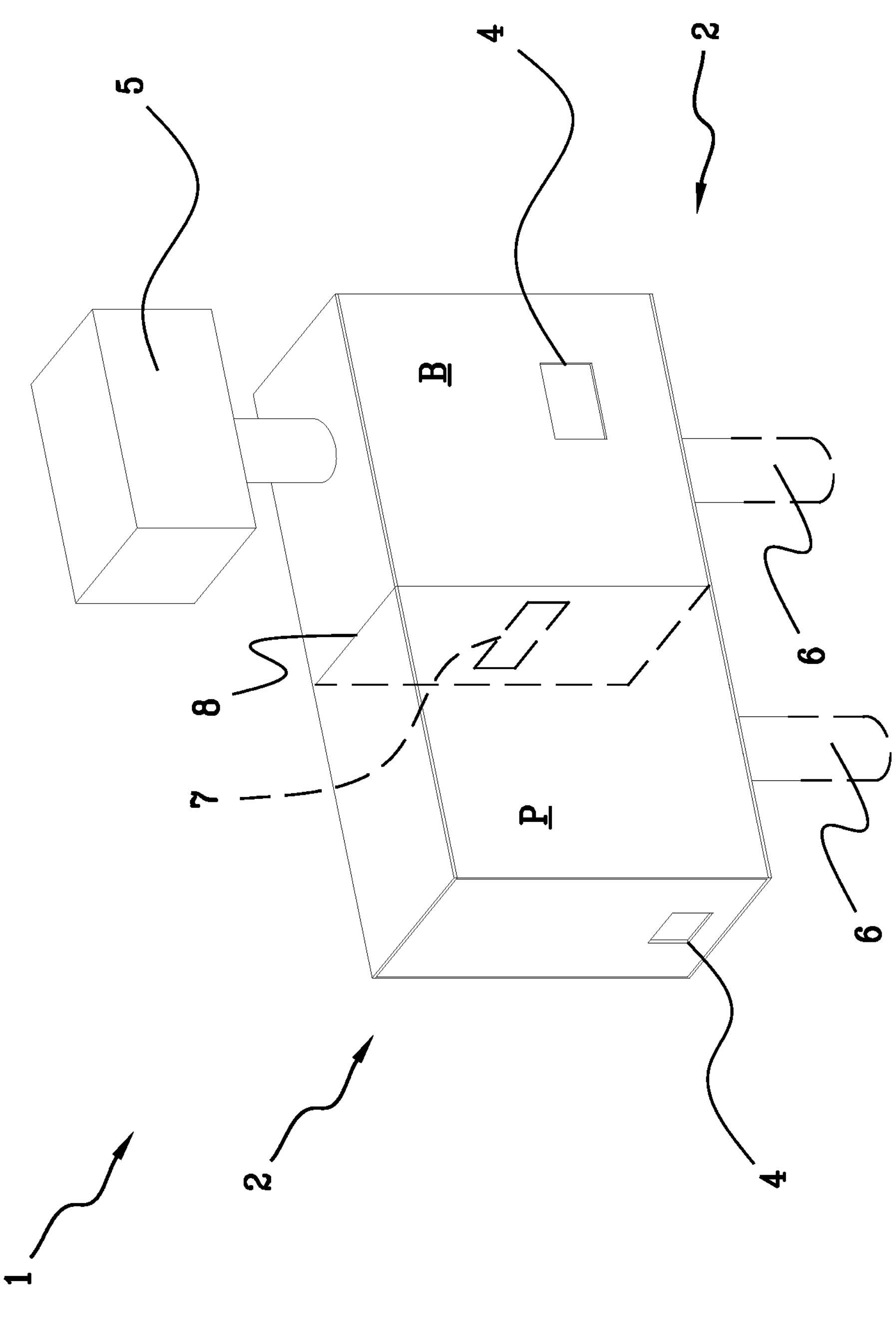
FIG. 2 illustrates, in perspective and schematic view, a first embodiment of a vertical farm system.

FIG. 2 illustrates a first embodiment of the invention, in which the first module comprises a collection opening 4 configurable between an open position and a closed position and, furthermore, such a first module is arranged in fluid connection with the forced recovery duct 6 so as to define a bi-functional module B. More precisely, the bi-functional module B is a growth and collection module configured for both the cultivation and for the collection of the plant crops contained therein. In particular, the movement means is configured to convey the plant crops from the cultivation apparatus 3 towards any collection opening 4.

Therefore, if the first module, i.e., the bi-functional module B, is configured to be used mainly as a growth module C, the cultivated plant crops are transferred through the transfer passage 7 to the second module, the collection module P, in order to be safely collected by a user.

Otherwise, if the first module, the bi-functional module B, is used both as a growth module C and as a collection module P, the plant crops are transferred from the cultivation apparatus 3 to the collection opening 4 of the second module without having to be passed through the transfer passage 7 which, therefore, can be kept closed to prevent part of the carbon dioxide from transferring therein. In such a case, as long as the bi-functional module B is configured as a growth module C, the carbon dioxide source 5 is configured to blow carbon dioxide while the forced recovery duct 6 is disabled and the collection opening 4 is kept closed. Thereafter, when the bi-functional module B is configured as a collection module P for the collection of the crops (following their movement at the collection opening 4), the forced recovery duct 6 is activated to aspirate the carbon dioxide (while, consequently, the carbon dioxide source 5 is disabled). Once the quantity of bi-functional module B carbon dioxide has fallen below a safety threshold value, the collection opening 4 is open to allow the user to safely collect the plant crops.

Figure 3:
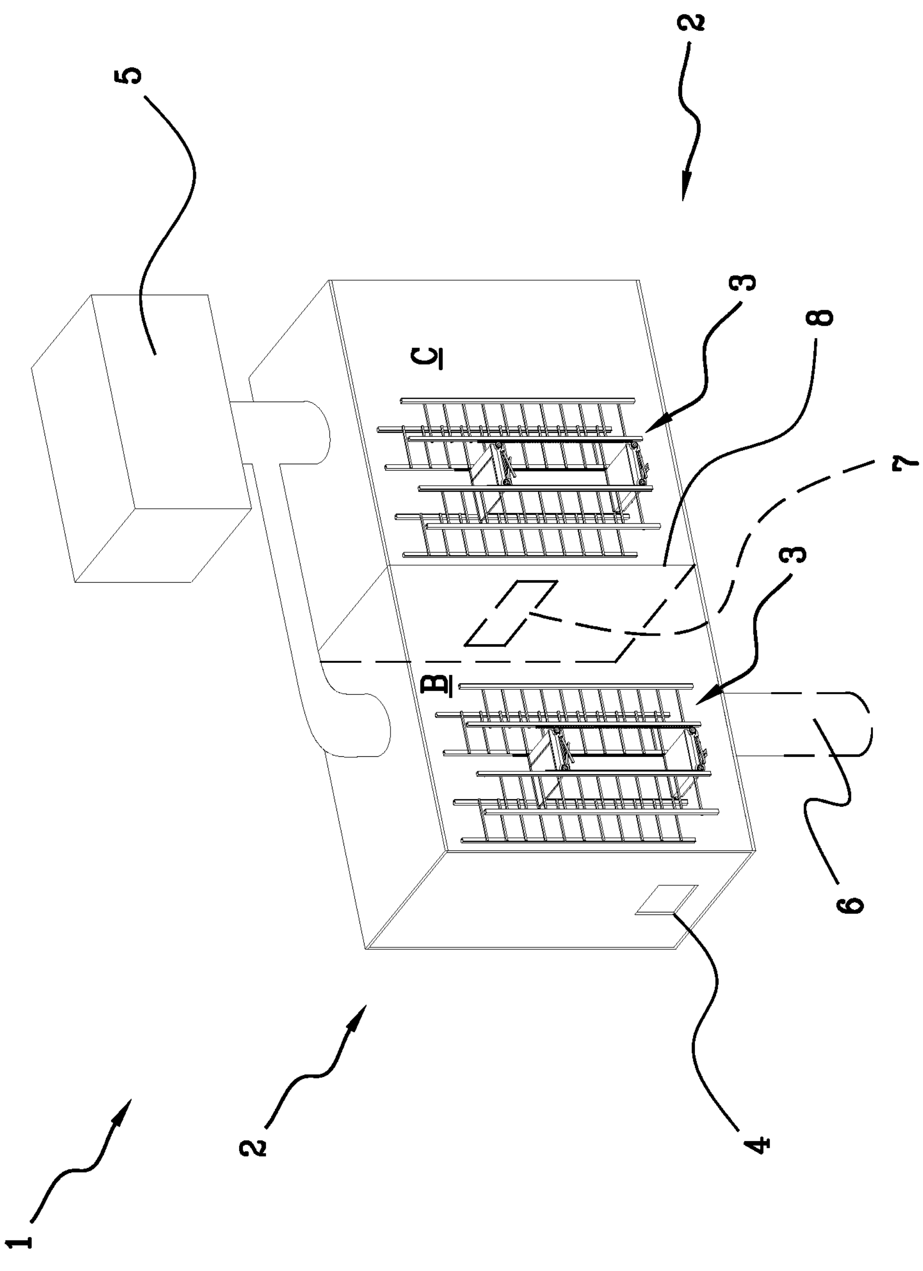
FIG. 3 illustrates, in perspective and schematic view, a second embodiment of a vertical farm system.

FIG. 3 illustrates a second embodiment of the invention, in which the second module comprises a plant crop cultivation apparatus 3 thereof and, furthermore, such a second module is arranged in fluid connection with the carbon dioxide source 5 so as to define a bi-functional module B. More precisely, the bi-functional module B is a growth and collection module configured for both the cultivation and for the collection of the plant crops contained therein. In particular, the movement means is configured to convey the plant crops from any cultivation apparatus 3 towards the collection opening 4.

Therefore, similar to what is expressed with reference to the embodiment illustrated in FIG. 2, the second module, i.e., the bi-functional module B, can be configured to operate mainly as a growth module C, or as a collection module P, or both as a growth module C (first, for the cultivation of the plant crops) and as a collection module P (then for the collection of the plant crops previously cultivated therein).

In the embodiment of FIG. 3, the bi-functional module B is connected to a first module configured as a growth module C. Therefore, in such a first module it is only possible to cultivate the plant crops which can be collected only after transfer through the transfer passage 7 in the second module, the bi-functional module B.

Figure 4:
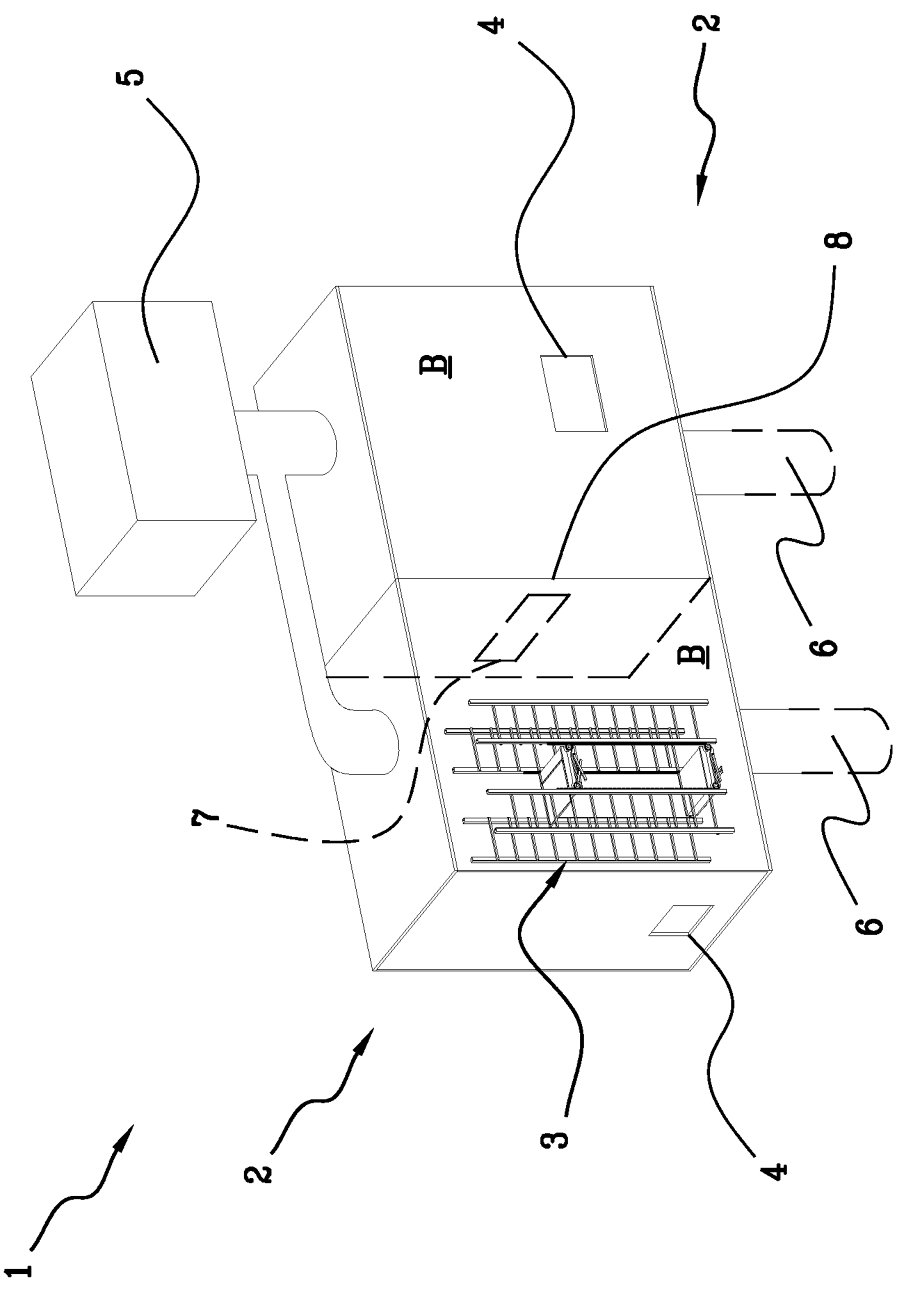
FIG. 4 illustrates, in perspective and schematic view, a third embodiment of a vertical farm system.

FIG. 4 illustrates a third embodiment of the invention, in which each module 2 of the plurality of modules 2 comprises a plant crop cultivation apparatus 3 thereof and a collection opening 4 thereof configurable between an open position and a closed position so as to define a respective bi-functional module B. More precisely, the bi-functional module B is a growth and collection module configured for both the cultivation and for the collection of the plant crops contained therein. In particular, the movement means is configured to convey the plant crops from any cultivation apparatus 3 towards any collection opening 4.

That is, FIG. 4 illustrates an embodiment of the system 1 in which each module 2 is a bi-functional module B.

Still in other words, the modules 2 are equivalent and interchangeable with each other since each of them is configurable to operate as a growth module C, as a collection module B or as a growth and collection module C, P.

Advantageously, each bi-functional module B is isolated with respect to the other modules 2, so that a microclimate different from the others can be generated in each of them, in order to cultivate different plant crops or the same crops, but at different stages of growth. The term microclimate refers to a particular combination of temperature, humidity, air concentration, and other climatic factors which influence the growth of plant crops.

Advantageously, the collection opening 4 is preferably hermetically closable so as to ensure that, when configured in the closed position, there is no exchange of matter (i.e., for example, plant crops and/or carbon dioxide) between the internal closed volume of the module 2 and the external environment.

Even more advantageously, the transfer passage 7 comprises a hermetically closable damper so as to ensure that, when closed, there is no exchange of matter (i.e., for example, plant crops and/or carbon dioxide) between the first module and the second module between which it is obtained.

In general, the entire system 1 is sealed with respect to an external environment by a plurality of gaskets configured to prevent the escape of carbon dioxide.

Figure 5:
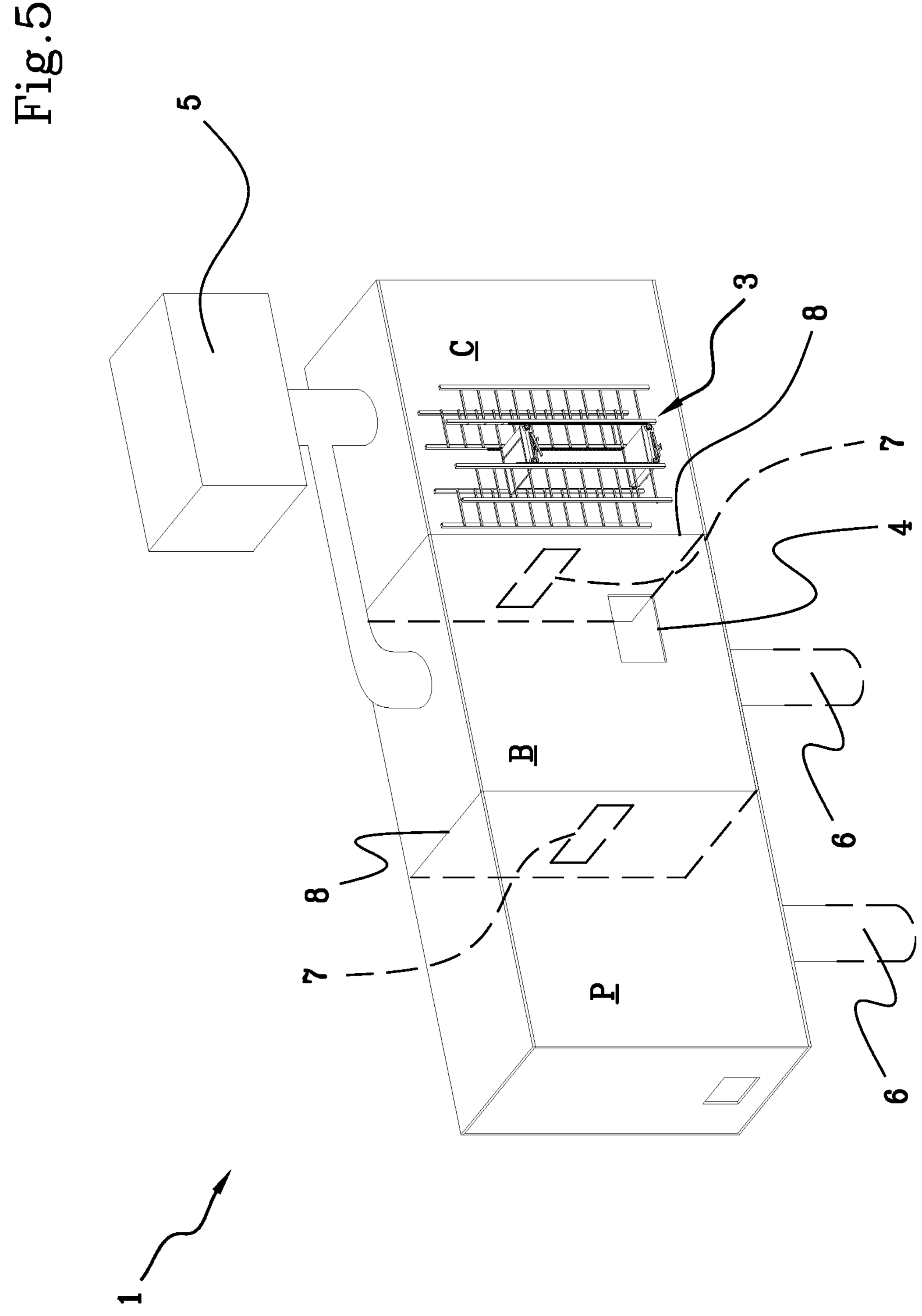
FIG. 5 illustrates, in perspective and schematic view, a fourth embodiment of a vertical farm system.

FIG. 5 illustrates a fourth embodiment of the invention in which there are three different modules and, more precisely, a collection module P, a bi-functional module B and a growth module C. In particular, the modules 2 are arranged side by side along the same longitudinal direction. However, the modules can be advantageously arranged so that the system 1 forms any desired shape so as to be able to optimize the spaces which the user has available for its construction and use, for example a warehouse.

Therefore, the system 1 can comprise a plurality of modules 2 divided as the user prefers between collection modules P, growth modules C and bi-functional modules B. For example, the modules 2 can be arranged side by side so as to form a substantially square path at the corners of which the collection modules P are arranged, while the remaining modules 2 are configured as bi-functional modules B.

Figure 6:
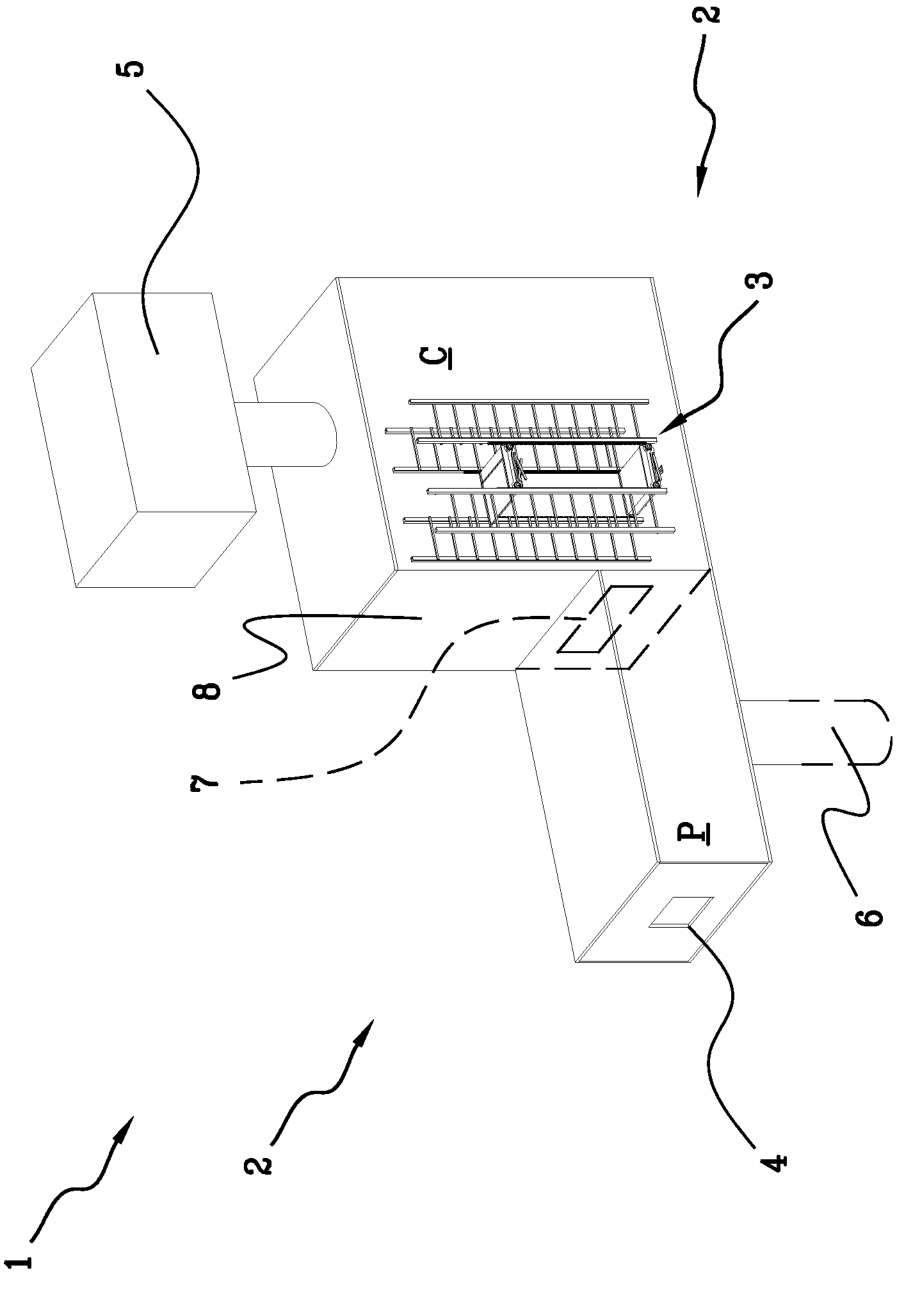
FIG. 6 illustrates, in perspective and schematic view, a fifth embodiment of a vertical farm system.

FIG. 6 illustrates a fourth embodiment of the invention, in which the closed volume of at least one collection module P has a smaller volumetric extension than the closed volume of each growth module C.

That is, the collection module P has a lower volumetric capacity than any other module 2 comprised in the system 1, in particular with respect to the growth modules C and/or the bi-functional modules B.

Thereby, the collection module P having a reduced volumetric extension is advantageously configured to act as a compensation chamber. That is, following the transfer of the crops to be collected into such a collection module P, the quantity of carbon dioxide which must be aspirated from the forced recovery duct 6 is considerably lower than the amount of carbon dioxide which the forced recovery duct 6 itself should recover from a normal collection module P and/or from a bi-functional module B operating as a collection module P.

Advantageously, therefore, the reduced volumetric extension of the collection module P allows a simpler and faster step of aspiration of the carbon dioxide contained therein.

That is, a collection module P having a reduced volumetric extension allows to significantly reduce the times necessary for the remediation of the carbon dioxide present therein so as to make the access of a user safe for the collection of the plant crops.

Preferably, the aforesaid collection module P with reduced volume comprises a conveyor belt (not illustrated) interposed between the transfer passage 7 and the collection opening 4.

That is, the aforesaid collection module P is formed as a tunnel which surrounds the collection opening 4 of the adjacent growth module C (or the bi-functional module B). The conveyor belt associated with the transfer passage 7 is configured to receive the plant crops to be conducted to the collection opening 4 of the same collection module P.

Even more preferably, outside the system 1, a further conveyor belt or a shelf is arranged at the collection opening 4 so as to allow the stationing of the plant crops for a subsequent collection by the user.

In accordance with an aspect of the invention, with particular reference to the embodiments illustrated in FIGS. 4 and 5, the system 1 comprises a control unit configured to perform the following operating steps as a function of relative external inputs received from a user:

activating the carbon dioxide source 5 to blow a predetermined quantity of carbon dioxide into one or more modules 2 of the plurality of bi-functional modules B so as to define respective first growth modules C for the cultivation of the plant crops contained therein;

moving, after a predetermined time interval, at least part of the plant crops from the respective cultivation apparatus 3 housed in a respective module of the first growth modules C towards at least one collection opening 4 of a respective module 2 of the plurality of bi-functional modules B so as to define at least one respective first collection module P;

activating the forced recovery duct 6 to aspirate the carbon dioxide from the first collection module P so as to allow the collection of the plant crops.

That is, the control unit is connected to substantially each component of the system 1 (movement means, carbon dioxide source . . . ) so as to perform the operation of the system 1 described above.

In particular, the control unit, following the reception of specific input signals generated by a user through a control panel 10 (FIG. 8*a*), is configured to generate and send specific control signals to move the crops, activate/deactivate the blowing and/or aspiration of carbon dioxide so as to define whether a module 2 must operate as a growth module C and/or as a collection module P.

In accordance with another aspect of the invention, the control unit is configured to perform the further operating steps as a function of relative further external inputs received:

deactivating the forced recovery duct 6 from the aspiration from the first collection module P;

activating the carbon dioxide source 5 to blow a predetermined quantity of carbon dioxide into at least one module 2 of the first growth modules C and/or in the first collection module P so as to define respective second growth modules C for the cultivation of the plant crops contained therein;

moving, after a predetermined time interval, at least part of the plant crops from the respective cultivation apparatus housed in a respective module 2 of the second growth modules C towards at least one collection opening 4 of a respective module 2 of the plurality of bi-functional modules B so as to define at least one respective first collection module P;

activating the forced recovery duct 6 to aspirate the carbon dioxide from the second collection module P so as to allow the collection of the plant crops.

Preferably, the control unit is programmed through the use of artificial intelligence and machine learning algorithms.

Referring to the embodiments illustrated in FIGS. 4 and 5, as already mentioned above, the bi-functional modules are advantageously configurable only as growth modules C, or only as collection modules P, or as growth and collection modules and, therefore, are equivalent and interchangeable with each other. In practice, a module initially used as growth modules C can be converted to a collection module P as long as it is connected to the forced recovery duct 6 and it has a respective collection opening 4. Conversely, a module initially used as a collection module P is convertible to a growth module C, as long as it contains a respective cultivation apparatus 3 and it is connected to the carbon dioxide source 5.

Therefore, in accordance with a further aspect of the invention, the first collection module P is selectable between one of the first growth modules C and/or the second collection module P is selectable between one of the second growth modules C.

Preferably, as previously described, the control unit is configured to manage the forced recovery duct 6 so that the latter conveys the carbon dioxide aspirated from the first and/or from the second collection module P towards the carbon dioxide source 5 and/or towards at least one module of the first and or the second growth modules C and/or towards a carbon dioxide collection tank.

In accordance with an aspect of the invention, the system 1 comprises a plurality of sensors for the analysis of the air composition (not shown) configured to detect the concentration of carbon dioxide, oxygen and other gaseous substances which could be present in each growth module C and in each collection module P.

Alternatively or in addition, at least one part of the aforesaid sensors can be installed outside each growth module C and/or each collection module P so as to detect any abnormal escape of carbon dioxide.

Advantageously, therefore, the air composition analysis sensors allow to keep the level of carbon dioxide present in each module 2 of the system 1 monitored so as to activate/deactivate/adjust the operation of the carbon dioxide source 5, the forced recovery duct 6 and the access openings (i.e., the collection windows 4 and the transfer passages 7) as a function of the value detected and compared with a reference value (variable with respect to the component of the system 1 which must be activated/deactivated/adjusted).

If at least part of the aforesaid sensors installed (also) outside each growth module C and/or each collection module P detect an abnormal escape of carbon dioxide, they are configured to send an alarm signal to a control unit and/or to a visual and/or acoustic feedback device (such as a siren), so as to warn a user of the presence of such abnormal escape to be remedied, as it is potentially dangerous.

In accordance with another aspect of the invention, the control unit is configured to enable the opening of a collection opening 4 of a respective collection module P when the plurality of air composition analysis sensors detects a safe quantity of carbon dioxide in the collection module P.

Thereby, the control unit allows a user to safely collect the plant crops (and, therefore, to come into contact with the internal volume of the collection module P through the collection window 4), only if a quantity of carbon dioxide less than 2.5%, preferably less than 0.08%, is detected, since a concentration of carbon dioxide above the aforementioned levels would be compromising for the performance, concentration and well-being of a person, up to being harmful to them.

In accordance with a further aspect of the invention, the carbon dioxide source 5 is activated or deactivated when the plurality of air composition analysis sensors detects in at least one respective growth module C a carbon dioxide value, respectively, lower or higher than a predetermined operating limit value. In addition, the forced recovery duct 6 is activated when the plurality of sensors detects in at least one respective collection module P a higher carbon dioxide value than a predetermined safety value. Preferably, the carbon dioxide source 5 and the forced recovery duct 6 are activated/deactivated/adjusted as a function of the carbon dioxide concentration value detected by the air composition analysis sensors in the respective reference modules 2 (respectively the growth modules C and the collection modules P). In greater detail, the carbon dioxide source 5 can comprise, for example, a gas containment tank and one or more solenoid valves adapted to regulate the delivery and/or recovery of the gas to/from the tank. That is, the carbon dioxide blowing/extraction is controlled by the carbon dioxide concentration or pressure value detected by the plurality of sensors present in the respective growth module C. For example, if the detected concentration value is lower than the optimal one, or if the pressure value inside the module is lower than an ambient pressure value, the carbon dioxide source 5 is activated to start blowing. Conversely, if the carbon dioxide concentration or pressure is excessive, forced recovery is activated through the forced recovery duct 6. In particular, in the collection module P, the recovery of carbon dioxide must be almost total, or at least such as to ensure a safe collection by a user.

Figure 7:
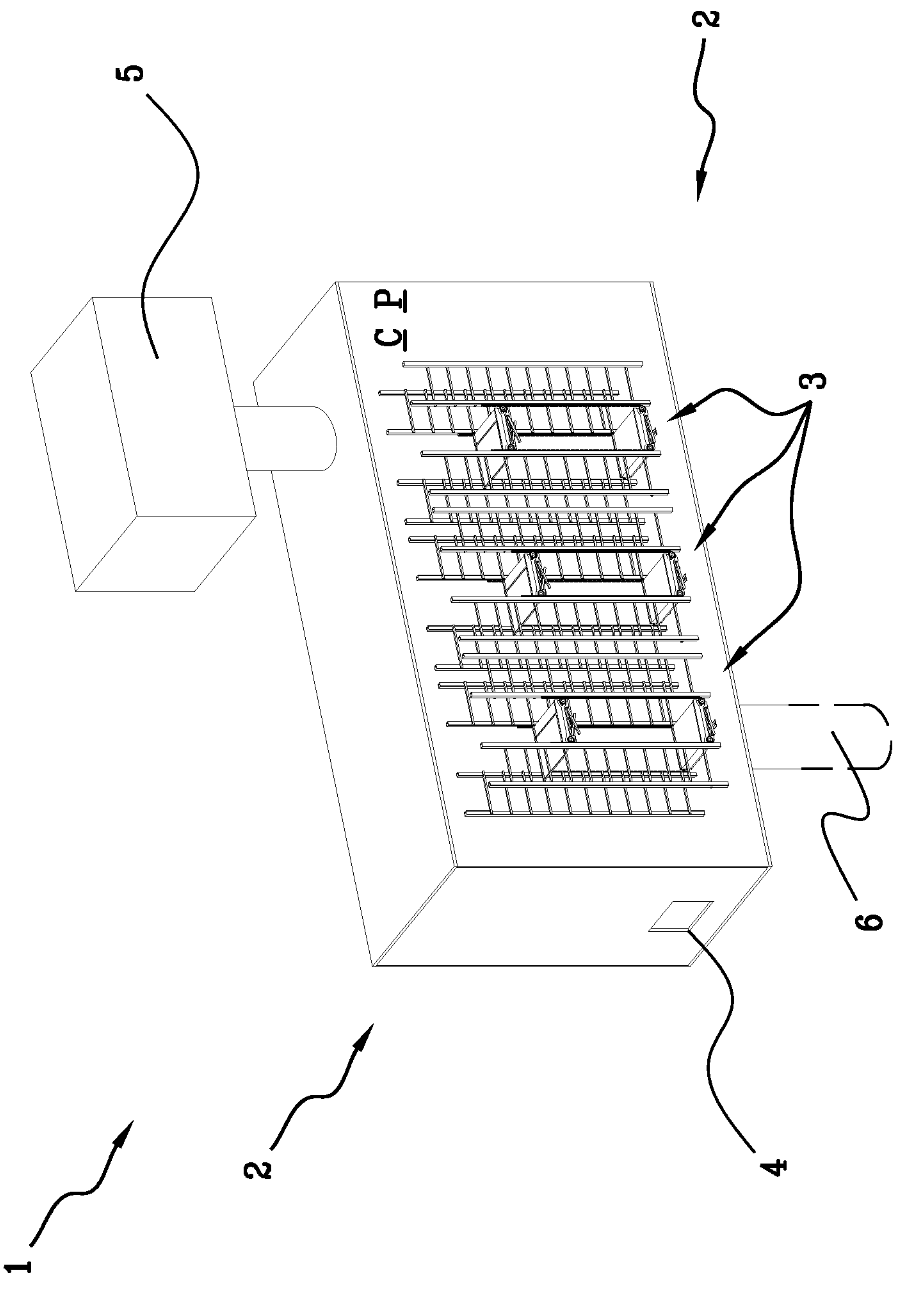
FIG. 7 illustrates, in perspective and schematic view, a sixth embodiment of a vertical farm system.

FIG. 7 illustrates a sixth embodiment of the invention, in which the first module and the second module coincide with each other in a single module having a closed volume thereof with respect to the external environment. In particular, the single module comprises a respective plant crop cultivation apparatus 3, a respective collection opening 4 configurable between a closed position and an open position, in which the respective internal volume is accessible from the external environment, and a movement means configured to convey the plant crops from the respective cultivation apparatus 3 towards the respective collection opening 4. Furthermore, the single module is arranged in fluid connection with the carbon dioxide source 5 and with the forced recovery duct 6 so as to define a bi-functional module B configured for the growth and collection of plant crops. In particular, the single module lacks the transfer passage 7 since there is no internal dividing bulkhead 8.

FIGS. **8*a* and 8*b* illustrate a possible embodiment of a growth and/or collection module, respectively, with and without a box-like body 11** which delimits the closed volume of the module with respect to the external environment.

In particular, the box-like body 11 visible in FIG. **8*a* consists of a plurality of side walls on which the collection openings 4 and/or the transfer passages 7 can be obtained. Therefore, one of such side walls can coincide with the aforesaid bulkhead 8 on which the transfer passage 7 is obtained, if such a wall is interposed between side-by-side modules 2**.

In FIG. **8*b*, the plant crop cultivation apparatus 3** is instead better visible.

In accordance with an aspect of the invention, the cultivation apparatus 3 comprises at least one shelving 12, preferably two facing and spaced from each other, divided into a plurality of growth areas 13.

A movable tray 14 on which the plant crops can be placed can be arranged in each growth section 13.

The movable tray 14 is preferably connected to the aforesaid movement means so as to be able to be moved between different growth sections 13 of the same shelving 12, of different shelvings or to a collection opening 4 of a collection module P as a function of the state of growth of the plant crops contained therein.

If there are at least two shelvings 12 facing and spaced from each other in the same module 2, there is a free gap 15 therebetween which is large enough to allow the passage of a movable tray 14 during its movement by the movement means.

FIG. 9 illustrates a further aspect of the invention with reference to the cultivation apparatus 3. In particular, FIG. 9 illustrates the front of a shelving containing different plant crops arranged on respective movable trays 14 arranged, in turn, in respective growth sections 13.

Each growth section 13 comprises lighting means 16 and/or irrigation means 17 and/or heating/cooling means 18 of the plant crops.

Thereby, each growth section 13 makes some of the most useful means available for the respective movable tray 14 to allow the correct cultivation of the plant crops contained therein, preferably at least all the aforesaid means, i.e., the lighting means 16 to simulate day/night cycles, the irrigation means 17 to provide the various necessary nutritional compounds and the heating/cooling means 18.

Preferably, the lighting means 16 comprises a plurality of LED light sources configured to emit light beams having the same wavelength or different wavelengths.

Thereby, each growth section is capable of simulating the day/night cycle suitable for the type of plant crop arranged in the movable tray 14 in question. In fact, some types of plant crops need to absorb a single light spectrum, while others prefer to receive different and overlapping light spectra.

Preferably, the irrigation means 17 is configured to dispense a hydration/nutrient fluid, for example water and/or fertilizers.

Advantageously, the heating/cooling means 18 is useful to simulate the temperature change during the day/night cycle.

In accordance with an aspect of the invention, the plurality of air composition analysis sensors also comprises further environmental sensors configured to detect respective environmental parameters of a growth module C, including temperature, humidity and light intensity. In particular, the environmental sensors are advantageously also configured to detect and monitor the variation of the aforesaid environmental parameters.

Preferably, the carbon dioxide source 5, and/or the lighting means 16 and/or the irrigation means 17 and/or the heating/cooling means 18 is/are configured to be activated/deactivated/adjusted as a function of the environmental parameters detected by the aforesaid further environmental sensors. That is, the carbon dioxide source 5 and/or the lighting means 16 and/or irrigation means 17 and/or heating/cooling means 18 is/are connected to the environmental sensors, for example through a control unit, so that their operation is regulated on the basis of the difference between the detected environmental parameters and the pre-set environmental reference parameters.

In accordance with a further aspect of the invention, the system 1 comprises a plurality of connection conduits, each of which is configured to put the various growth modules C and the various collection modules P in fluid connection with each other. Thereby the transfer of carbon dioxide inside the system 1 is ensured and, furthermore, the formation of a closed circuit with carbon dioxide recycling is ensured.

The invention claimed is:

1. A vertical farm system, comprising:

a carbon dioxide source configured to blow a predetermined amount of carbon dioxide into at least one growth module;

a forced carbon dioxide recovery duct configured to aspirate the carbon dioxide contained in at least one collection module;

at least two modules each of which has a closed volume thereof with respect to an external environment, wherein:

a first module comprises a first plant crop cultivation apparatus and is arranged in fluid connection with said carbon dioxide source so as to define a growth module configured to cultivate plant crops, said first module comprises a first collection opening thereof configurable between an open position and a closed position and is arranged in fluid connection with said forced recovery duct so as to define a bi-functional module configured for both the cultivation and for the collection of plant crops, and a second module comprises a second collection opening configurable between a closed position and an open position, in which the respective internal volume is accessible from the external environment, and is arranged in fluid connection with said forced recovery duct so as to define a collection module configured to collect the plant crops; and a movement device configured to convey the plant crops from said first plant crop cultivation apparatus to any one of said first collection opening or second collection opening.

2. The system according to claim 1, wherein:

said second module comprises a second plant crop cultivation apparatus thereof and is arranged in fluid connection with said carbon dioxide source so as to define a bi-functional module configured for both the cultivation and for the collection of the plant crops, and said movement device being configured to convey the plant crops from any one of said first plant crop cultivation apparatus or said second plant crop cultivation apparatus towards any one of said first collection opening or second collection opening.

3. The system according to claim 1, wherein:

each module of said at least two modules comprises a plant crop cultivation apparatus and a collection opening configurable between an open position and a closed position so as to define a respective bi-functional module configured for both the cultivation and for the collection of the plant crops, and said movement device being configured to convey the plant crops from any cultivation apparatus towards any collection opening.

4. The system according to claim 3, comprising a control unit configured to perform, as a function of external inputs:

activating said carbon dioxide source to blow a predetermined amount of carbon dioxide into one or more modules of said plurality of bi-functional modules so as to define respective first growth modules for the cultivation of the plant crops contained therein;

moving, after a predetermined time interval, at least part of the plant crops from the respective cultivation apparatus housed in a respective module of said first growth modules towards at least one collection opening of a respective module of said plurality of bi-functional modules so as to define at least one respective first collection module; and activating said forced recovery duct to aspirate the carbon dioxide from said first collection module so as to allow the collection of the plant crops.

5. The system according to claim 4, wherein said first collection module is selected from one of said first growth modules.

6. The system according to claim 4, wherein said control unit is configured to manage said forced recovery duct so that the latter conveys the carbon dioxide aspirated from said first collection module towards said carbon dioxide source and/or towards at least one module of said first growth modules and/or towards a carbon dioxide collection tank.

7. The system according to claim 4, wherein said control unit is configured to perform, as a function of further external inputs:

deactivating said forced recovery duct from the aspiration from said first collection module;

activating said carbon dioxide source to blow a predetermined amount of carbon dioxide into at least one module of said first growth modules and/or in said first collection module so as to define respective second growth modules for the cultivation of the plant crops contained therein;

moving, after a predetermined time interval, at least part of the plant crops from the respective cultivation apparatus housed in a respective module of said second modules towards at least one collection opening of a respective module of said plurality of bi-functional modules so as to define at least one respective second collection module; and activating said forced recovery duct to aspirate the carbon dioxide from said second collection module so as to allow the collection of the plant crops.

8. The system according to claim 7, wherein said second collection module is selected from one of said second growth modules.

9. The system according to claim 7, wherein said control unit is configured to manage said forced recovery duct so that the latter conveys the carbon dioxide aspirated from said second collection module towards said carbon dioxide source and/or towards at least one module of said second growth modules and/or towards a carbon dioxide collection tank.

10. The system according to claim 1, comprising a plurality of air composition analysis sensors configured to detect at least the concentration of carbon dioxide in each growth module and in each collection module.

11. The system according to claim 10, wherein said control unit is configured to enable the opening of a collection opening of a respective collection module when said plurality of sensors detects a safe quantity of carbon dioxide in said collection module.

12. The system according to claim 10, wherein:

said carbon dioxide source is activated or deactivated when said plurality of sensors detects in at least one respective growth module a carbon dioxide value, respectively, lower or higher than a predetermined operating limit value; and said forced recovery duct is activated when said plurality of sensors detects in at least one respective collection module a higher carbon dioxide value than a predetermined safety value.

13. The system according to claim 1, wherein said carbon dioxide source is configured to blow a quantity of carbon dioxide such that the resulting pressure in the closed volume of said growth module is at least equal to the atmospheric pressure value.

14. The system according to claim 1, wherein said carbon dioxide source is configured to blow a quantity of carbon dioxide such that the resulting pressure in the closed volume of said growth module is higher than the atmospheric pressure value.

15. The system according to claim 1, wherein said forced recovery duct is configured to convey the amount of carbon dioxide aspirated from each collection module to said carbon dioxide source and/or to a carbon dioxide collection tank and/or to a growth module so as to define a closed circuit with carbon dioxide recirculation.

16. The system according to claim 1, wherein the closed volume of at least one collection module has a smaller volumetric extension than the closed volume of each growth module.

17. The system according to claim 16, wherein said collection module comprises a conveyor belt interposed between said transfer passage and said collection opening.

18. The system according to claim 1, wherein:

said first module and said second module coincide with each other in a single module having a closed volume thereof with respect to the external environment, said single module comprising a plant crop cultivation apparatus, a collection opening configurable between a closed position and an open position, in which the respective internal volume is accessible from the external environment, and a movement device configured to convey the plant crops from said cultivation apparatus to said collection opening, said single module being arranged in fluid connection with said carbon dioxide source and with said forced recovery duct so as to define a bi-functional module configured for the growth and collection of plant crops, and said single module lacks said transfer passage.

19. A vertical farm system, comprising:

a carbon dioxide source configured to blow a predetermined amount of carbon dioxide into at least one growth module;

a forced carbon dioxide recovery duct configured to aspirate the carbon dioxide contained in at least one collection module;

at least two modules each of which has a closed volume thereof with respect to an external environment, wherein:

a first module comprises a first plant crop cultivation apparatus and is arranged in fluid connection with said carbon dioxide source so as to define a growth module configured to cultivate plant crops, a second module comprises a collection opening configurable between a closed position and an open position, in which the respective internal volume is accessible from the external environment, and is arranged in fluid connection with said forced recovery duct so as to define a collection module configured to collect the plant crops, and said second module comprises a plant crop cultivation apparatus thereof and is arranged in fluid connection with said carbon dioxide source so as to define a bi-functional module configured for both the cultivation and for the collection of the plant crops, and a movement device configured to convey the plant crops from any one of said first plant crop cultivation apparatus or said second plant crop cultivation apparatus towards said first collection opening through a transfer passage made between said first module and said second module.

* * * * *